(12) United States Patent
Ballard

(10) Patent No.: US 12,202,117 B2
(45) Date of Patent: Jan. 21, 2025

(54) TOOL WITH HYDRAULIC SYSTEM FOR REGENERATIVE EXTENSION AND TWO-SPEED OPERATION

(71) Applicant: Milwaukee Electric Tool Corporation, Brookfield, WI (US)

(72) Inventor: James G. Ballard, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/051,392

(22) PCT Filed: Sep. 3, 2020

(86) PCT No.: PCT/US2020/049169
§ 371 (c)(1),
(2) Date: Oct. 28, 2020

(87) PCT Pub. No.: WO2021/046197
PCT Pub. Date: Mar. 11, 2021

(65) Prior Publication Data
US 2023/0191581 A1    Jun. 22, 2023

Related U.S. Application Data

(60) Provisional application No. 62/895,153, filed on Sep. 3, 2019.

(51) Int. Cl.
*B25F 5/00* (2006.01)
*H01R 43/042* (2006.01)
*B23D 17/06* (2006.01)

(52) U.S. Cl.
CPC ......... *B25F 5/005* (2013.01); *H01R 43/0427* (2013.01); *B23D 17/06* (2013.01)

(58) Field of Classification Search
CPC ...... B25F 5/005; H01R 43/0427; B23D 17/06
See application file for complete search history.

(56) References Cited

U.S. PATENT DOCUMENTS

| | | | |
|---|---|---|---|
| 3,071,926 A * | 1/1963 | Olson | B66F 9/22 |
| | | | 91/420 |
| 3,383,963 A | 5/1968 | Vondrachek | |
| 3,559,668 A | 2/1971 | Crossman | |
| 3,987,705 A * | 10/1976 | Strassheimer | B29C 45/67 |
| | | | 91/416 |
| 4,206,603 A | 6/1980 | Mekler | |

(Continued)

FOREIGN PATENT DOCUMENTS

| | | |
|---|---|---|
| CN | 106949274 A | 7/2017 |
| EP | 2187066 A1 | 5/2010 |
| WO | 2015/061425 A1 | 4/2015 |

*Primary Examiner* — Thomas M Wittenschlaeger
*Assistant Examiner* — Katie L Gerth
(74) *Attorney, Agent, or Firm* — Quarles & Brady LLP

(57) ABSTRACT

Embodiments of the invention provide a hydraulic tool including a hydraulic actuator cylinder, a piston, a fluid reservoir, a pump, a regeneration check valve, and a pilot-operated valve. The regeneration check valve is disposed in a regenerative extension fluid path that fluidly couples a first and second chamber of the hydraulic actuator cylinder. The pilot-operated valve is disposed in a power extension fluid path that fluidly couples the second chamber to a fluid reservoir.

20 Claims, 7 Drawing Sheets

(56) References Cited

U.S. PATENT DOCUMENTS

| | | | |
|---|---|---|---|
| 5,065,664 A * | 11/1991 | Ohta | F15B 11/024 60/474 |
| 5,419,236 A * | 5/1995 | Plettner | H01H 33/34 91/416 |
| 5,836,400 A * | 11/1998 | Tupper | B25F 5/005 173/208 |
| 5,884,540 A | 3/1999 | Mo | |
| 5,961,521 A | 10/1999 | Roger et al. | |
| 5,996,465 A * | 12/1999 | Morikawa | E02F 3/965 91/458 |
| 6,401,515 B2 | 6/2002 | Frenken | |
| 6,408,622 B1 * | 6/2002 | Tsuruga | E02F 9/2285 91/446 |
| 6,769,356 B2 | 8/2004 | Frenken | |
| 7,040,214 B2 * | 5/2006 | Cossette | E02F 3/965 91/420 |
| 7,540,231 B2 * | 6/2009 | Hofmann | F15B 11/024 91/436 |
| 7,788,962 B2 | 9/2010 | Chiasson et al. | |
| 7,814,827 B2 | 10/2010 | Frenken et al. | |
| 7,937,838 B2 | 5/2011 | Patton | |
| 7,954,742 B2 | 6/2011 | Ramun et al. | |
| 8,251,157 B2 | 8/2012 | Gray et al. | |
| 8,266,991 B2 | 9/2012 | Thorson et al. | |
| 8,316,549 B2 | 11/2012 | Musser | |
| 8,683,704 B2 | 4/2014 | Scott et al. | |
| 8,763,257 B2 | 7/2014 | Thorson et al. | |
| 8,844,436 B2 | 9/2014 | Frenken | |
| 8,851,200 B2 | 10/2014 | Gray et al. | |
| 8,875,404 B2 | 11/2014 | Scott et al. | |
| 8,966,691 B2 | 3/2015 | Richards | |
| 9,016,317 B2 | 4/2015 | Myrhum, Jr. | |
| 9,196,881 B2 | 11/2015 | Gray et al. | |
| 9,302,402 B2 | 4/2016 | Thorson et al. | |
| 9,484,700 B2 | 11/2016 | Kehoe | |
| 9,486,864 B2 | 11/2016 | Luo et al. | |
| 9,486,865 B2 | 11/2016 | Scott et al. | |
| 9,669,533 B2 | 6/2017 | Myrhum, Jr. | |
| 9,722,334 B2 | 8/2017 | Sterling et al. | |
| 9,808,851 B2 | 11/2017 | Thorson et al. | |
| 9,822,805 B2 * | 11/2017 | De Gier | E02F 9/2267 |
| D805,365 S | 12/2017 | Ballard et al. | |
| 9,873,187 B2 | 1/2018 | Bungler | |
| 9,960,509 B2 | 5/2018 | Sterling et al. | |
| 9,993,885 B2 | 6/2018 | Frenken | |
| 10,046,470 B2 | 8/2018 | Thorson et al. | |
| 10,058,989 B2 | 8/2018 | Chellen | |
| 10,093,012 B2 | 10/2018 | Koski et al. | |
| 10,128,723 B2 | 11/2018 | Mergener et al. | |
| 10,213,821 B2 | 2/2019 | Thorson et al. | |
| 10,226,826 B2 | 3/2019 | Kehoe et al. | |
| 10,265,758 B2 | 4/2019 | Skinner et al. | |
| 10,270,263 B2 | 4/2019 | Brozek | |
| 10,312,653 B2 | 6/2019 | Ballard et al. | |
| 10,339,496 B2 | 7/2019 | Matson et al. | |
| 10,343,266 B2 | 7/2019 | Theiler et al. | |
| 10,380,883 B2 | 8/2019 | Matson et al. | |
| 10,428,843 B2 | 10/2019 | Ballard et al. | |
| D866,623 S | 11/2019 | Fenske | |
| 10,498,195 B2 | 12/2019 | Mergener et al. | |
| D878,435 S | 3/2020 | Fenske | |
| 10,576,557 B2 | 3/2020 | Fenske | |
| 10,618,151 B2 | 4/2020 | Kanack et al. | |
| 10,700,575 B2 | 6/2020 | Hessenberger et al. | |
| 2005/0011236 A1 | 1/2005 | Frenken et al. | |
| 2006/0000349 A1 * | 1/2006 | Cossette | F15B 15/149 91/6 |
| 2007/0003392 A1 | 1/2007 | Frenken et al. | |
| 2008/0069663 A1 | 3/2008 | Frenken et al. | |
| 2009/0229842 A1 | 9/2009 | Gray et al. | |
| 2010/0088898 A1 | 4/2010 | Thorson et al. | |
| 2010/0325894 A1 | 12/2010 | Scott et al. | |
| 2011/0005083 A1 | 1/2011 | Scott et al. | |
| 2011/0005084 A1 | 1/2011 | Thorson et al. | |
| 2011/0266834 A1 | 11/2011 | Beumer et al. | |
| 2012/0318546 A1 | 12/2012 | Gray et al. | |
| 2013/0008031 A1 | 1/2013 | Thorson et al. | |
| 2013/0068090 A1 * | 3/2013 | Luyendijk | F15B 11/022 91/166 |
| 2013/0086899 A1 * | 4/2013 | Sefcik | F15B 15/149 60/459 |
| 2013/0097873 A1 | 4/2013 | Luo et al. | |
| 2014/0034159 A1 | 2/2014 | Myrhum, Jr. | |
| 2014/0173907 A1 | 6/2014 | Scott et al. | |
| 2014/0182137 A1 | 7/2014 | Liu et al. | |
| 2015/0014008 A1 | 1/2015 | Gray et al. | |
| 2015/0191897 A1 * | 7/2015 | Zhang | E02F 9/2296 60/413 |
| 2015/0217438 A1 | 8/2015 | Myrhum, Jr. | |
| 2016/0099533 A1 | 4/2016 | Kehoe | |
| 2016/0214265 A1 | 7/2016 | Thorson et al. | |
| 2016/0252112 A1 | 9/2016 | Kehoe et al. | |
| 2016/0288193 A1 | 10/2016 | Thorson et al. | |
| 2016/0329674 A1 * | 11/2016 | Ballard | H01R 43/0427 |
| 2016/0363510 A1 | 12/2016 | Kanack et al. | |
| 2016/0364687 A1 | 12/2016 | Matson et al. | |
| 2016/0373457 A1 | 12/2016 | Matson et al. | |
| 2017/0013740 A1 | 1/2017 | Mergener et al. | |
| 2017/0271893 A1 | 9/2017 | Brozek | |
| 2017/0350027 A1 | 12/2017 | Belbachir et al. | |
| 2017/0355027 A1 | 12/2017 | D'Antuono | |
| 2017/0356472 A1 * | 12/2017 | Ballard | B23D 17/06 |
| 2018/0021840 A1 | 1/2018 | Thorson et al. | |
| 2018/0085903 A1 | 3/2018 | Wackwitz et al. | |
| 2018/0085909 A1 | 3/2018 | Koski et al. | |
| 2018/0093319 A1 | 4/2018 | Skinner et al. | |
| 2018/0099388 A1 | 4/2018 | Koski et al. | |
| 2018/0147618 A1 | 5/2018 | Skinner et al. | |
| 2018/0281272 A1 | 10/2018 | Dickert et al. | |
| 2018/0311805 A1 | 11/2018 | Koski et al. | |
| 2018/0326600 A1 | 11/2018 | Wason et al. | |
| 2019/0052149 A1 | 2/2019 | Mergener et al. | |
| 2019/0151967 A1 | 5/2019 | Kehoe et al. | |
| 2019/0156278 A1 | 5/2019 | Matson et al. | |
| 2019/0176207 A1 | 6/2019 | Thorson et al. | |
| 2019/0232481 A1 | 8/2019 | Skinner et al. | |
| 2019/0260266 A1 | 8/2019 | Hessenberger et al. | |
| 2019/0318616 A1 | 10/2019 | Matson et al. | |
| 2020/0001446 A1 | 1/2020 | Ballard et al. | |
| 2020/0055130 A1 | 2/2020 | D'Antuono et al. | |
| 2020/0061854 A1 | 2/2020 | D'Antuono | |
| 2020/0070262 A1 | 3/2020 | D'Antuono | |
| 2020/0070263 A1 | 3/2020 | Olbrich | |
| 2020/0147771 A1 | 5/2020 | Mergener et al. | |
| 2020/0180128 A1 | 6/2020 | Schneider et al. | |
| 2020/0238487 A1 | 7/2020 | Kanack et al. | |
| 2020/0261959 A1 | 8/2020 | Wekwert et al. | |
| 2020/0266684 A1 | 8/2020 | Hessenberger et al. | |
| 2020/0298388 A1 * | 9/2020 | Norquist | B25F 5/00 |
| 2023/0046222 A1 * | 2/2023 | Ballard | B21D 39/048 |

* cited by examiner

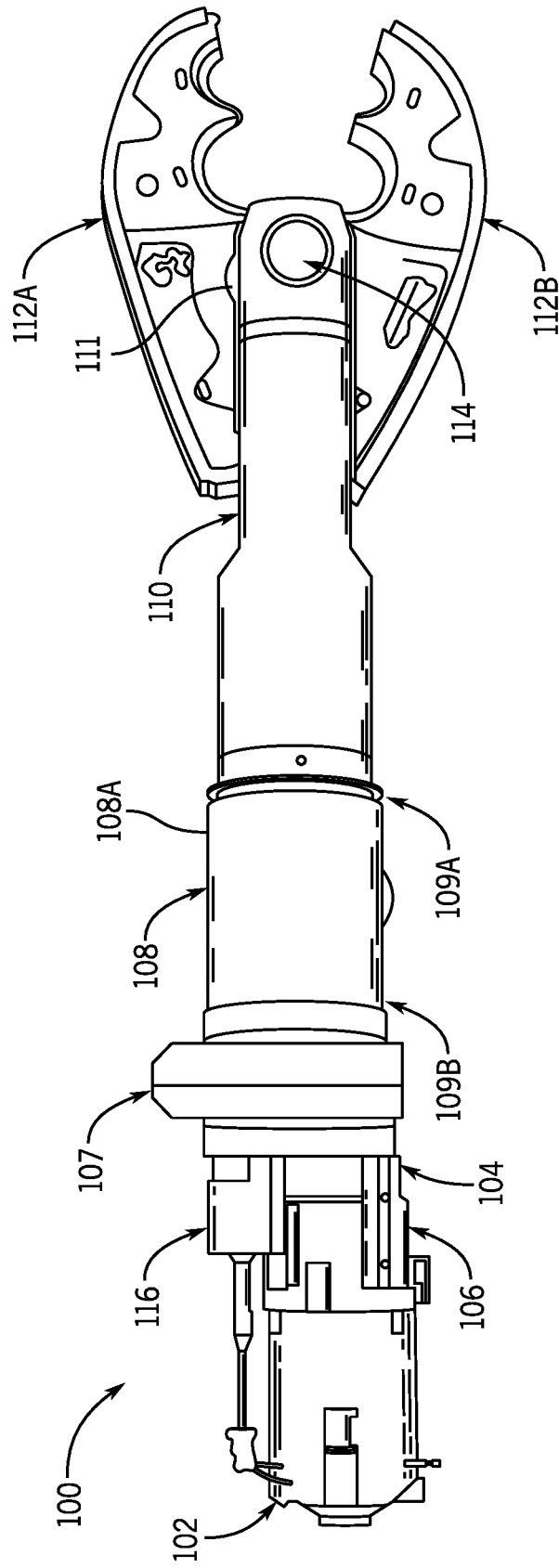

TOOL WITH HYDRAULIC SYSTEM FOR REGENERATIVE EXTENSION AND TWO-SPEED OPERATION

RELATED APPLICATIONS

The present application represents the national stage entry of International Application No. PCT/US2020/049169, filed Sep. 3, 2020, which claims priority to U.S. Provisional Application No. 62/895,153, filed Sep. 3, 2019, entitled "Tool with Hydraulic System for Regenerative Extension and Two-Speed Operation," the content of which is incorporated herein by reference in its entirety.

BACKGROUND

Crimpers and cutters often include a crimping head with opposed jaws that include certain crimping and cutting features, depending on the particular configuration of the tool. Some crimpers and cutters are hydraulic power tools that include a piston that can exert force on the crimping head, which may be used for closing the jaws to perform crimp or compression work at a targeted crimp location.

SUMMARY

Embodiments of the invention provide systems, tools, hydraulic circuits, and methods associated with two-speed operation of a hydraulic tool.

Some embodiments of the invention provide a hydraulic tool including a hydraulic actuator cylinder, a piston, a fluid reservoir, a pump, a regeneration check valve, and a pilot-operated valve. The piston is disposed within the hydraulic actuator cylinder. The piston includes a piston head, and the piston head divides an internal space of the hydraulic actuator cylinder into a first chamber and a second chamber. The pump is configured to draw fluid from the fluid reservoir and provide fluid to the first chamber via a hydraulic supply line. The regeneration check valve is disposed in a regenerative extension fluid path that fluidly couples the second chamber to the first chamber. The pilot-operated valve is disposed in a power extension fluid path that fluidly couples the second chamber to the fluid reservoir. The pilot-operated valve includes a first port that is fluidly coupled to the second chamber, a second port that is fluidly coupled to the fluid reservoir, and a pilot port that is fluidly coupled to the hydraulic supply line via a pilot line. In some embodiments, as fluid flows through the regenerative extension fluid path, the piston moves at a first speed. As fluid flows through the powered extension fluid path, the piston moves at a second speed.

Some embodiments of the invention provide a method of operating a hydraulic tool. The method includes providing fluid having a pressure less than a first threshold pressure from a pump via a hydraulic supply line to a first chamber of a cylinder of the hydraulic tool. The method includes moving a piston within the cylinder, blocking fluid flow through a powered extension fluid path when the pressure is less than a second threshold pressure, opening a pilot-operated valve as the pressure at a pilot port exceeds the second threshold pressure, and fluidly coupling the second chamber to a fluid reservoir so that fluid exits the second chamber as the piston moves within the cylinder.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 7 is a perspective view of a hydraulic tool according to one embodiment of the invention.

DETAILED DESCRIPTION

Figure 1:
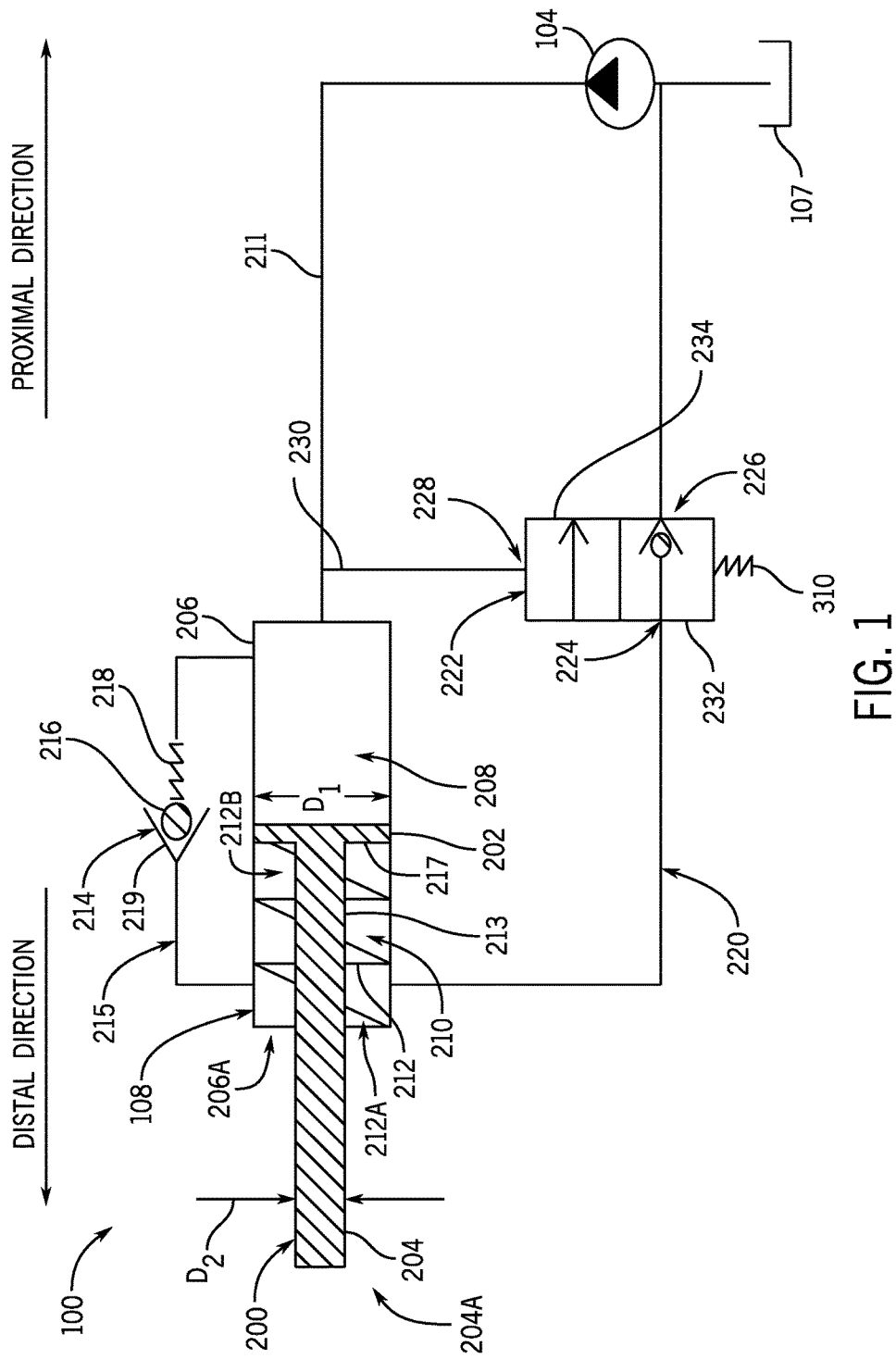
FIG. 1 is a partial hydraulic schematic of a hydraulic tool according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A hydraulic tool can be used to cut or crimp cables. The hydraulic tool can include a cylinder and piston configuration, where the piston is configured to extend and retract within the cylinder, and thus move jaws or any other implement coupled to the piston to perform a task (crimping, cutting, etc.).

To make a hydraulic tool more efficient, it may be desirable to have a tool where the piston can move at variable speeds and apply different forces based on a condition or state of the tool. For instance, the piston can be configured to move at a fast speed and apply a small force while travelling within its cylinder before the jaws (or blades attached to the jaws) coupled to the piston reaches a cable to be cut or crimped. Once the jaws reach the cable, the piston can slow down, but cause the jaws to apply a larger force to perform a cutting or crimping operation.

FIG. 1 illustrates a partial hydraulic schematic of a hydraulic tool, such a hydraulic tool 100, as further described with reference to FIG. 7. The hydraulic tool 100 includes a piston 200 within a hydraulic actuator cylinder 108. The piston 200 includes a piston head 202 and a piston rod 204 extending from the piston head 202 along a central axis of the hydraulic actuator cylinder 108. A distal end 204A of the piston rod 204 is coupled to a tool portion of the hydraulic tool 100, such as jaws 112A, 112B shown in FIG. 7, so that motion of the piston rod 204 cause the jaws 112A, 112B to pivot about a pivot 114. In other embodiments, the tool portion can include a crimper.

The hydraulic actuator cylinder 108 can have a cylinder body 206. The piston head 202 is configured to divide an internal space of the cylinder body 206 into two chambers: a first chamber 208 and a second chamber 210. A pump 104 is configured to provide fluid flow to the first chamber 208 via a hydraulic supply line 211 to cause the piston 200 to slide axially in the distal direction within the hydraulic actuator cylinder 108.

The hydraulic tool 100 also includes a return spring 212 configured as a compression spring disposed in the first chamber 208 about an exterior peripheral surface 213 of the piston rod 204. A distal end 212A of the return spring 212 can be affixed at a distal end 206A of the cylinder body 206, whereas a proximal end 212B of the return spring 212 can be coupled to the piston head 202 and applies a force on a surface 217 of the piston head 202 in the proximal direction to bias the piston 200 in the proximal direction (to the right in FIG. 1).

The hydraulic tool 100 can include a regeneration check valve 214 disposed in a regenerative extension fluid path 215 and configured to fluidly couple the second chamber 210 to the first chamber 208. For example, the regeneration check valve 214 can have a ball 216 and a spring 218 forcing the ball 216 against a seat 219. The ball 216 blocks fluid flow from the first chamber 208 to the second chamber 210 while allowing fluid from the second chamber 210 to flow to the first chamber 208 once pressure level of fluid in the second chamber 210 overcomes the force of the spring 218 on the ball 216.

The hydraulic tool 100 includes a pilot-operated valve 222 disposed in a powered extension fluid path 220. The pilot-operated valve 222 can also be referred to as a sequence valve. The pilot-operated valve 222 has a first port 224 fluidly coupled to the second chamber 210, a second port 226 fluidly coupled to the fluid reservoir 107, and a pilot port 228 fluidly coupled to the pump 104 via a pilot line 230 that is fluidly coupled to the hydraulic supply line 211. The pilot-operated valve 222 is configured to switch between operating in an unactuated or first state 232 and an actuated or second state 234 based on pressure level of fluid in the hydraulic supply line 211 and the pilot line 230.

Figure 2:
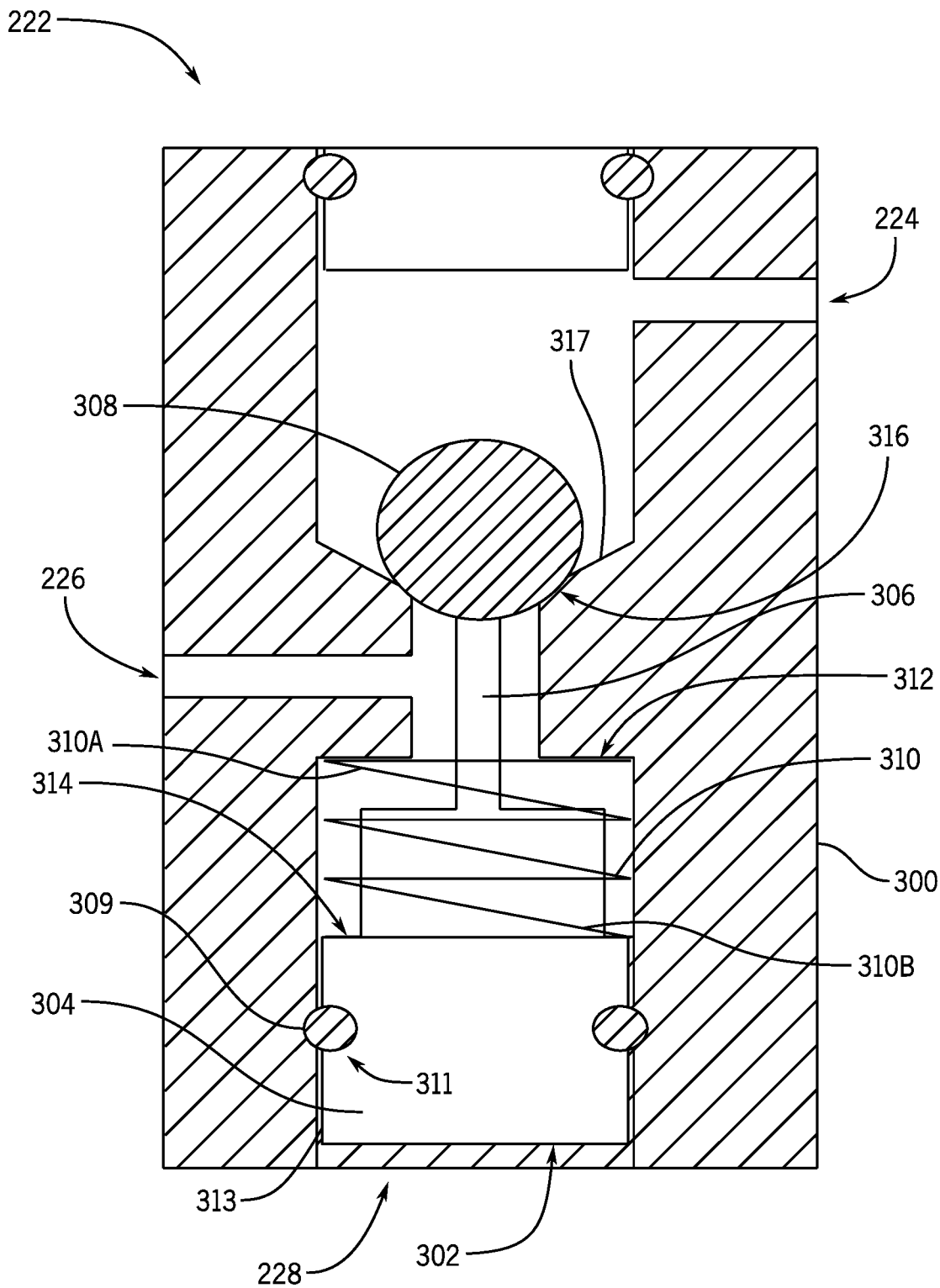
FIG. 2 is a partial cross-sectional view of a pilot-operated valve.

FIG. 2 illustrates a partial cross-section of the pilot-operated valve 222. The pilot-operated valve 222 can include a valve body or housing 300 that defines (i) the first port 224 fluidly coupled to the second chamber 210, (ii) the second port 226 fluidly coupled to the fluid reservoir 107, and (iii) the pilot port 228 fluidly coupled to the pilot line 230.

The housing 300 defines a longitudinal cylindrical cavity 302. The pilot-operated valve 222 includes a valve piston 304 disposed in the longitudinal cylindrical cavity 302 and is axially or longitudinally movable. The valve piston 304 has a valve rod portion 306 that is coupled to a check ball 308. The pilot-operated valve 222 includes a seal 309 (e.g., an O-ring) disposed in a groove 311 formed on an exterior peripheral surface 313 of the valve piston 304 to block fluid leakage between the second port 226 and the pilot port 228.

The pilot-operated valve 222 includes a valve spring 310 disposed about the exterior peripheral surface 313 of the valve piston 304. The valve spring 310 has (i) a first end 310A resting against a shoulder 312 formed as a stepped surface in the interior surface of the housing 300, and (ii) a second end 310B resting against a shoulder 314 formed as a stepped surface in the exterior surface of the valve piston 304. With this configuration, the first end 310A of the valve spring 310 is fixed, whereas the second end 310B is axially movable with the valve piston 304. Thus, the valve spring 310 applies a biasing force on the valve piston 304 in a closing direction (e.g., downward in FIG. 2) that in turn biases the check ball 308 to be seated at a valve seat 316 formed in the interior peripheral surface 317 of the housing 300. In some embodiments, the valve spring 310 can apply a pressure of about 500 pounds per square inch (psi) on the valve piston 304 in the closing direction.

The position or state shown in FIG. 2 with the check ball 308 being seated at the valve seat 316 corresponds to the unactuated or first state 232 shown in FIG. 1. Referring to FIGS. 1 and 2, in the first state 232, the pressure level of fluid at the pilot port 228 received via the pilot line 230 (which is substantially the same pressure level in the hydraulic supply line 211 and the first chamber 208) is below a threshold pressure value determined by the valve spring 310.

For example, the valve spring 310 can have a spring rate and a preload that causes the valve spring 310 to apply a pressure of about 500 psi on the valve piston 304 in the closing direction (i.e., apply a pressure that tends to bias the check ball 308 toward the valve seat 316). In this case, the threshold pressure value can be about 500 psi, and if the pressure level of fluid at the pilot port 228 is below such threshold pressure value, the valve spring 310 biases the check ball 308 toward the valve seat 316, and the check ball 308 blocks fluid flow from the first port 224 to the second port 226. Thus, in the first state 232, the powered extension fluid path 220 is blocked.

If the pressure level of fluid at the pilot port 228 exceeds the threshold pressure value, the pilot-operated valve 222 switches to the second state 234. In the second state 234, the fluid at the pilot port 228 causes the valve piston 304 to move against the biasing force of the valve spring 310, causing the check ball 308 to be unseated off or away from the valve seat 316. As the check ball 308 is unseated off the valve seat 316, fluid is allowed to flow from the first port 224 (which is fluidly coupled to the second chamber 210) around the check ball 308 and the valve rod portion 306 to the second port 226, and then to the fluid reservoir 107.

When an electric motor, such as a motor 102 of the hydraulic tool 100 is activated at the beginning of a crimping or cutting cycle, the electric motor 102 drives the pump 104, and the pump 104 draws fluid from the fluid reservoir 107. The fluid reservoir 107 can include fluid at a low pressure level, e.g., a pressure of 0-20 psi. The pump 104 then provides the fluid through the hydraulic supply line 211 to the first chamber 208 of the hydraulic actuator cylinder 108. The fluid flowing into the first chamber 208 applies a force on the piston 200 (particularly, on the piston head 202) in the distal direction.

Initially, the force might not be sufficient to overcome the biasing force of the return spring 212. For example, the return spring 212 can be configured to apply pressure of about 150 psi on the piston 200 in the proximal direction, and if the pressure level provided by the pump 104 is less than 150 psi, the first chamber 208 is filled with fluid, but the piston 200 might not move. As the first chamber 208 is filled with fluid, pressure level within the first chamber 208 increases.

Figure 3:
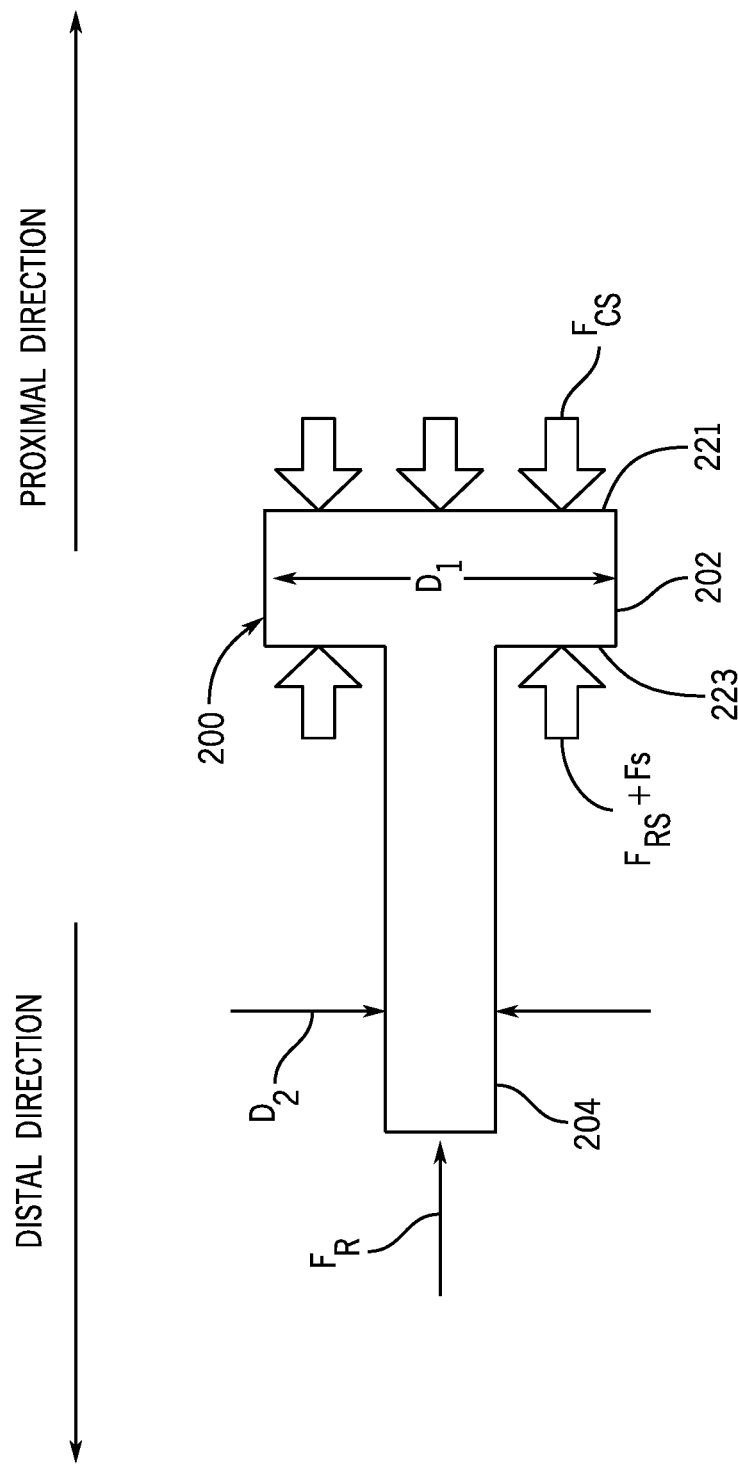
FIG. 3 is a schematic view of a piston showing forces acting thereon.

FIG. 3 schematically illustrates the forces acting on the piston 200. Fluid entering the first chamber 208 applies a force on a cap side 221 the piston 200 in the distal direction that can be designated as $F_{CS}$. Assuming that the piston head 202 has a diameter $D_1$ and surface area $A_1$, and the fluid has a pressure level of P, the cap side force $F_{CS}$ that the fluid applies to the piston 200 in the distal direction can be determined as:

$$F_{CS} = PA_1 = P\frac{\pi D_1^2}{4} \quad (1)$$

On the other hand, fluid in the second chamber 210 applies a respective force on the piston 200, and particularly on a rod side 223 of the piston head 202, in the proximal direction. The respective force that the fluid in the second chamber 210 applies to the piston 200 in the proximal direction can be designated as $F_{RS}$. Assuming that the piston rod 204 has a diameter $D_2$, then the cross-sectional area $A_{rod}$ of the piston rod 204 is $$\pi \frac{D_2^2}{4},$$

and the annular surface area $A_2$ on which the fluid in the second chamber 210 applies a force in the proximal direction can be determined as:

$$A_2 = A_1 - A_{rod} = \pi\left(\frac{D_1^2}{4} - \frac{D_2^2}{4}\right) \quad (2)$$

During a first portion of the cycle, the pressure level of fluid entering the first chamber 208 and communicated to the pilot port 228 of the pilot-operated valve 222 via the pilot line 230 is less than the threshold pressure value determined by the valve spring 310 (e.g., less than 500 psi). As a result, the pilot-operated valve 222 operates in the first state 232, where the powered extension fluid path 220 is blocked, and fluid exiting the second chamber 210 is diverted or forced to flow through the regenerative extension fluid path 215 via the regeneration check valve 214 to the first chamber 208.

As long as the pressure level of fluid provided to the first chamber 208 and the pilot line 230 via the hydraulic supply line 211 is less than the threshold pressure value determined by the valve spring 310 of the pilot-operated valve 222, the hydraulic tool 100 operates in a regeneration extension mode. In the regeneration extension mode, fluid from the pump 104 enters the first chamber 208 via the hydraulic supply line 211, and as the piston 200 extends, fluid in the second chamber 210 flows via the regenerative extension fluid path 215 through the regeneration check valve 214 to the first chamber 208.

As a result of the regeneration check valve 214 fluidly coupling the chambers 208, 210, pressure levels of fluid in the chambers 208, 210 can be considered to be substantially equal when performing a static or quasi static analysis on forces acting on the piston 200. Thus, assuming that pressure level in the second chamber 210 is also P, then the force $F_{RS}$ can be determined as:

$$F_{RS} = PA_2 = P\pi\left(\frac{D_1^2}{4} - \frac{D_2^2}{4}\right) \quad (3)$$

The return spring 212 also applies force on the piston 200 in the proximal direction, which can be designated as $F_S$ and can be determined as:

$$F_S = k\Delta x \quad (4)$$

where k is the spring rate of the return spring 212 and $\Delta x$ is the displacement of the free end of the return spring 212 (the end resting against the piston head 202) from its unloaded, uncompressed position.

The jaws 112A, 112B apply a reaction force $F_R$ acting in the proximal direction on the piston 200. The balance of forces acting on the piston 200 can be expressed as:

$$F_S + F_R + F_{RS} = F_{CS} \quad (5)$$

Combining equations 1, 3, 4, and 5, $F_R$ can be expressed as:

$$F_R = P\frac{\pi D_1^2}{4} - P\pi\left(\frac{D_1^2}{4} - \frac{D_2^2}{4}\right) - k\Delta x \quad (6)$$

The following expression follows from equation (6):

$$F_R = P\frac{\pi D_2^2}{4} - k\Delta x \quad (7)$$

The term $$P\frac{\pi D_2^2}{4}$$

can be referred to as rod fluid force or $F_{rod}$. Equation (7) indicates that if $F_{rod}$ is greater than the spring force $F_S$ (which is based at least in part on the spring rate of the return spring 212), then the reaction force $F_R$ is positive, and the piston 200 can start to extend (e.g., move to in the distal direction to the left in FIGS. 1 and 3). As the piston 200 extends, the jaws 112A, 112B can pivot in a closing direction toward a cable.

As long as the pressure level of fluid provided to the first chamber 208 and the pilot line 230 via the hydraulic supply line 211 is less than the threshold pressure value determined by the valve spring 310 of the pilot-operated valve 222, the hydraulic tool 100 operates in a regeneration extension mode. In the regeneration extension mode, fluid from the pump 104 enters the first chamber 208 via the hydraulic supply line 211, and as the piston 200 extends, fluid in the second chamber 210 flows via the regenerative extension fluid path 215 through the regeneration check valve 214 to the first chamber 208.

In this regeneration extension mode, the total fluid flow entering the first chamber 208 is the aggregate of fluid flow rate $Q_{Pump}$ supplied by the pump 104 and fluid flow rate $Q_{RS}$ of rod side flow of fluid exiting the second chamber 210 and provided to the first chamber 208. The aggregate flow rate can be referred to as $Q_1$ and can be expressed as:

$$Q_1 = Q_{Pump} + Q_{RS} \quad (8)$$

In the regeneration extension mode with the fluid flow rate of fluid entering the first chamber 208 being $Q_1$, the piston 200 moves at a speed equal to $V_1$ that can be calculated using the following equation:

$$V_1 = \frac{Q_1}{A_1} = \frac{Q_{Pump} + Q_{RS}}{A_1} \quad (9)$$

Further, in the regeneration extension mode, if the pressure of the fluid is P, then the net fluid force $F_1$ applied on the piston 200 in the distal direction can be calculated using the following equation:

$$F_1 = P(A_1 - A_2) = PA_{rod} \quad (10)$$

As the piston 200 extends, the return spring 212 is compressed further, thus the biasing force $F_S$ it applies on the piston 200 increases. Further, the jaws 112A and 112B move toward each other in preparation for cutting or crimping a cable. As the jaws 112A and 112B reach the cable, the cable resists their motion. Increased resistance from the cable in addition to the increased biasing force of the return spring 212 causes the pressure of the hydraulic fluid provided by the pump 104 to the first chamber 208 via the hydraulic supply line 211 to rise. In turn, the pressure level of fluid provided to the pilot port 228 of the pilot-operated valve 222 via the pilot line 230 (which is coupled to the hydraulic supply line 211) also rises.

The pressure level of fluid provided to the pilot port 228 continues to increase as the resistance to the motion of the piston 200 increases. Once the pressure level reaches or exceeds the threshold pressure value determined by the valve spring 310 as described with respect to FIG. 2, the pilot-operated valve 222 switches to operating in the second state 234. In the second state 234, the valve piston 304 moves axially (e.g., upward in FIG. 2) and the check ball 308 is unseated, allowing fluid at the first port 224 to flow (e.g., with minimal resistance or minimal fluid pressure drop) to the second port 226.

The pilot-operated valve 222 forms the path of least resistance for fluid exiting the second chamber 210, and the fluid exiting the second chamber 210 flows through the powered extension fluid path 220, rather than the regenerative extension fluid path 215. In this state, the hydraulic tool 100 operates in a powered extension mode rather than the regeneration extension mode.

In the powered extension mode, the flow rate of fluid entering the first chamber 208 is only $Q_{Pump}$, and the piston 200 moves at a speed equal to $V_2$ that can be calculated using the following equation:

$$V_2 = \frac{Q_{Pump}}{A_1} \quad (11)$$

Further, in the powered extension mode, if the pressure level of the fluid entering the first chamber 208 is P and the pressure of fluid in the second chamber 210 is substantially equal to pressure level of fluid in the fluid reservoir 107 ($P_{reservoir}$), then the net fluid force $F_2$ applied on the piston 200 in the distal direction can be calculated using the following equation:

$$F_2 = PA_1 - P_{reservoir} A_2 \quad (12)$$

In some embodiments, assuming that the fluid reservoir 107 stores fluid having a pressure level substantially equal to atmospheric pressure (e.g., $P_{reservoir} = 0$), then according to equation (13), $F_2$ can be determined as:

$$F_2 = PA_1 \quad (13)$$

Comparing equations (11) and (9), $V_2$ (speed of the piston 200 in the powered extension mode) is less than $V_1$ (speed of the piston 200 in the regeneration extension mode) because of the decrease in flow rate of fluid entering the first chamber 208 from ($Q_{Pump} + Q_{RS}$) to only $Q_{Pump}$ once the pilot-operated valve 222 switches to the second state 234. While the piston 200 advances rapidly in the regeneration extension mode at the speed $V_1$, the piston 200 slows down to a controlled speed that can provide a more precise cutting or crimping operation in the power extension mode.

Further, comparing equations (13) and (10), $F_2$ (the net fluid force applied on the piston 200 in the powered extension mode) is greater than $F_1$ (the net fluid force applied on the piston 200 in the regeneration extension mode) because $PA_1 > PA_{rod}$. Thus, when the pilot-operated valve 222 switches to the second state 234, the net fluid force applied on the piston 200 (and thus the force that the jaws 112A, 112B apply on a cable) increases to $PA_1$ from $PA_{rod}$. As the pressure level P continues to increase due to the increased resistance by the cable as the jaws 112A, 112B clamp on the cable, the force to $PA_1$ can continue to increase to a force that is sufficiently large in magnitude to cut or crimp the cable.

Once the cable is cut or crimped and the piston 200 reaches an end of its stroke within the hydraulic actuator cylinder 108, the pressure level of the fluid increases because the electric motor 102 continues to drive the pump 104. The pressure level can keep increasing until it reaches a threshold pressure value. In some embodiments, the threshold pressure value can be about 8500 psi. Once the controller receives information from the pressure sensor 116 that the pressure level has reached the threshold pressure value, the controller can responsively shut off the electric motor 102.

To retract the piston 200 (e.g., move the piston 200 to the right in FIG. 1), the hydraulic tool 100 can include a release or dump valve (not shown) fluidly coupled to the first chamber 208. When the release valve is actuated (e.g., either manually via a release lever or electronically via the controller), the release valve opens and forms a path for fluid in the first chamber 208 back to the fluid reservoir 107.

Once the release valve opens, the return spring 212 disposed in the chamber 210 pushes the piston 200 in the proximal direction causing the piston 200 to retract as pressurized fluid in the first chamber 208 is drained back to the fluid reservoir 107 via the release valve.

Figure 4:
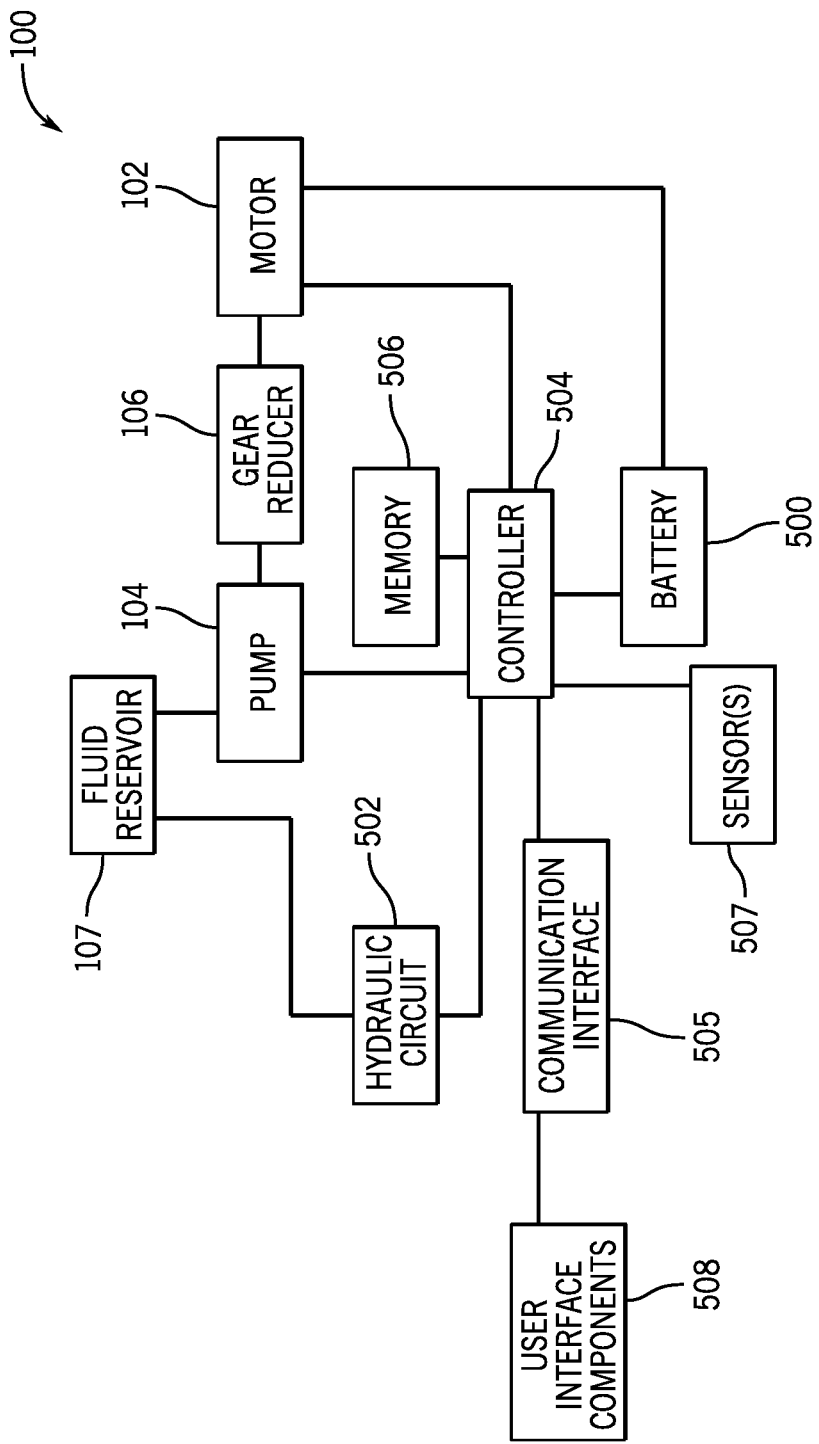
FIG. 4 is a block diagram representing components of a hydraulic tool.

FIG. 4 schematically illustrates components of the hydraulic tool 100 according to one embodiment of the invention. The hydraulic tool 100 includes a battery 500 configured to provide electric power to the electric motor 102. The electric motor 102 can be mechanically coupled to the pump 104 via the gear reducer 106, which is configured to reduce a rotational speed of an output shaft of the electric motor 102 when the electric motor 102 is actuated.

As the electric motor 102 is actuated, the pump 104 draws fluid from the fluid reservoir 107 and then provides fluid via a hydraulic circuit 502 (e.g., hydraulic circuit described and illustrated in FIGS. 1 and 2) to the hydraulic actuator cylinder 108 of the hydraulic tool 100 to drive (e.g., extend) the piston 200 and move the jaws 112A, 112B. The electric motor 102 is actuated via command signals provided by a controller 504 of the hydraulic tool 100.

The controller 504 can include one or more processors or microprocessors and may include data storage (e.g., memory, transitory computer-readable medium, non-transitory computer-readable medium, etc.), such as memory 506. The memory 506 can have stored thereon instructions that, when executed by the one or more processors of the controller 504, cause the controller 504 to perform the operations described herein.

The hydraulic tool 100 can further include one or more sensors, such as sensor(s) 507. The sensor(s) 507 can, for example, include the pressure sensor 116. The sensor(s) 507 can alternatively or additionally include other sensors, such as a position sensor that indicates position of the piston 200 within the hydraulic actuator cylinder 108 or a force sensor (e.g., a load cell) that indicates the force acting on the piston 200.

In some embodiments, the hydraulic tool 100 can include a communication interface 505 that enables the controller 504 to communicate with various components of the hydraulic tool 100, such as user interface components 508, the electric motor 102, the memory 506, the battery 500, the sensor(s) 507, and various components of the hydraulic circuit 502.

Figure 5:
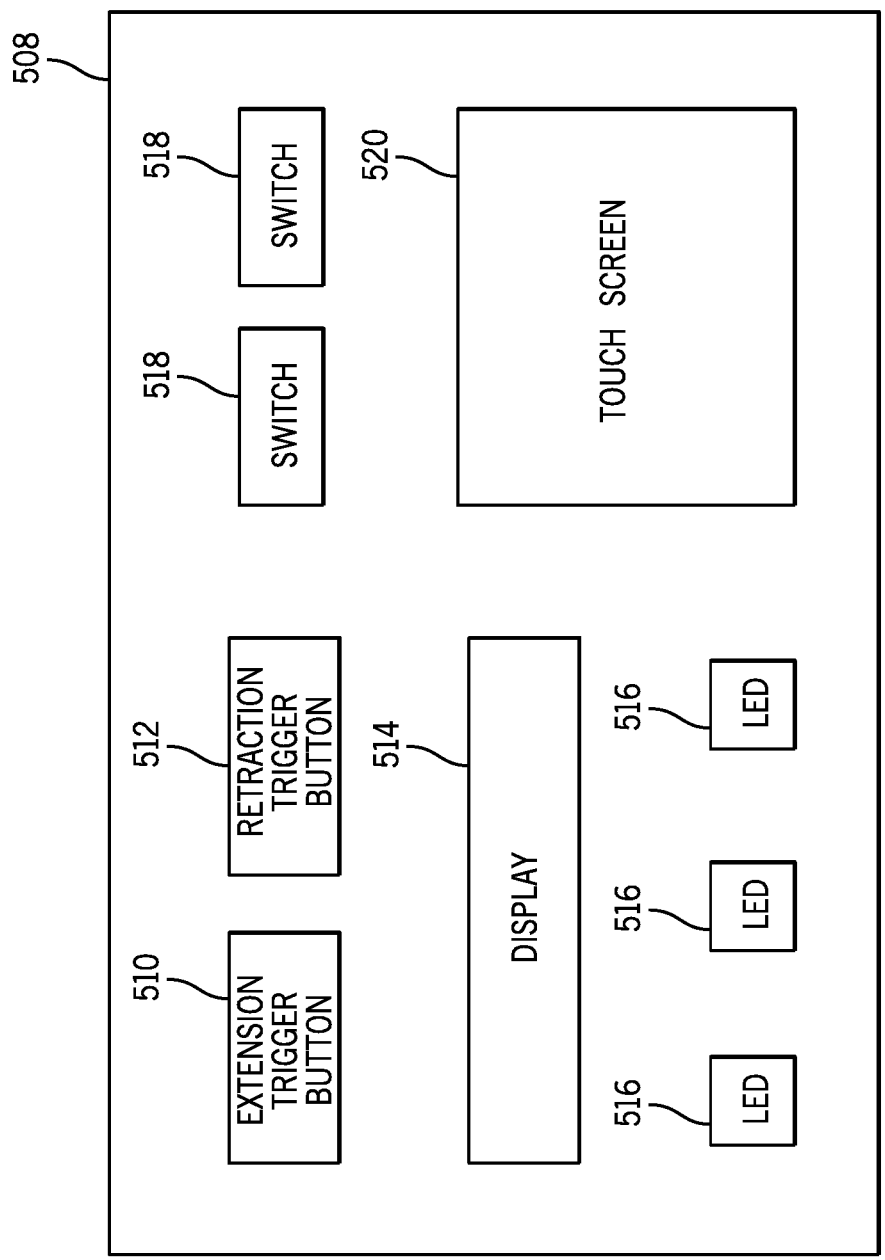
FIG. 5 is a block diagram representing user interface components.

FIG. 5 schematically illustrates the user interface components 508. The user interface components 508 can include, for example, an extension trigger button 510 and a retraction trigger button 512, among other components such as a display 514, light emitting diodes 516 that can be configured as indicative lights, switches 518, touch screens 520, etc. The controller 504 can receive an input or input information from various input devices of the user interface components 508 via the communication interface 505 or can receive a signal from a remote controller, and in response, provide electrical signals to other components of the hydraulic tool 100.

For example, if the hydraulic tool 100 includes an extension trigger button 510, when such button is pressed, an electrical signal is provided to the controller 504 indicating to the controller 504 that the extension trigger button 510 has been triggered or activated. In response, the controller 504 sends a command signal causing the electric motor 102 to be activated (e.g., rotate in a first rotational direction), causing the piston 200 inside the hydraulic actuator cylinder 108 to extend. If the pressure sensor 116 indicates a threshold pressure level is exceeded, the controller 504 can stop the electric motor 102 from rotating.

To retract the piston 200, a release lever can be coupled to the hydraulic tool 100, that when the release lever is operated, the first chamber 208 is relieved, allowing the piston 200 to retract. Additionally or alternatively the hydraulic tool 100 can include a retraction trigger button 512 that, when pressed, causes an electric signal to be provided to the controller 504, indicating to the controller 504 that the retraction trigger button 512 has been triggered or activated. In response, the controller 504 can send a command signal causing the electric motor 102 to rotate in a second rotational direction opposite the first rotational direction, causing the piston 200 to retract.

Figure 6:
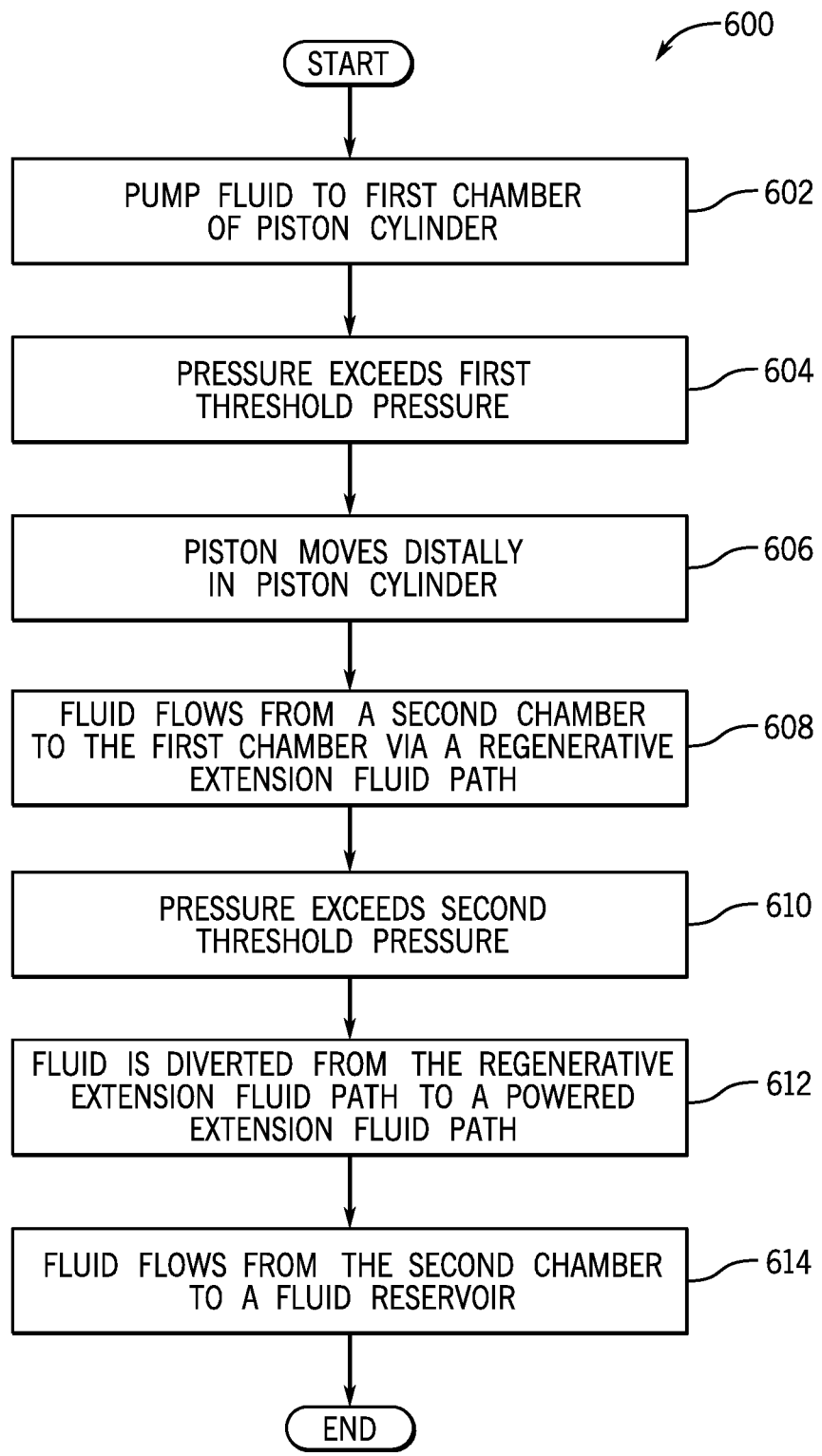
FIG. 6 is a flowchart of a method for operating a hydraulic tool according to one embodiment of the invention.

FIG. 6 is a flowchart of a method 600 for operating a hydraulic tool according to some embodiments of the invention. The method 600 may begin at step 602 by providing a fluid from the pump 104 via the hydraulic supply line 211 to the first chamber 208 of the hydraulic actuator cylinder 108 of the hydraulic tool 100. The fluid can have a pressure level less than a first threshold pressure value. In some embodiments, the first threshold pressure value is at least partially governed by the regeneration check valve 214. In other embodiments, the first threshold pressure value is at least partially governed by the return spring 212. At step 604, as the pressure exceeds the first threshold pressure value which causes the piston 200 to move distally within the hydraulic actuator cylinder 108 at step 606. As the piston 200 moves relatively fast within the hydraulic actuator cylinder 108, fluid flows from the second chamber 210 to the first chamber 208 through the regenerative extension fluid path 215 at step 608.

As the pressure level exceeds a second threshold pressure value at the pilot port 228 at step 610, the pilot-operated valve 222 is opened and fluid is diverted from the regenerative extension fluid path 215 to the powered extension fluid path 220 at step 612. The second threshold pressure value is governed by the valve spring 310. As fluid is diverted from the regenerative extension fluid path 215 to the powered extension fluid path 220 via the pilot-operated valve 222, the fluid exits the second chamber 210 to the fluid reservoir 107 at step 614. As fluid flows from the second chamber 210 to the fluid reservoir, the piston 200 moves relatively slow within the hydraulic actuator cylinder 108.

FIG. 7 illustrates the hydraulic tool 100 according to one embodiment of the invention. Although the example implementation described herein references an example crimping tool, embodiments of the invention can be implemented in other tools (e.g., cutting tools).

The hydraulic tool 100 includes the electric motor 102 (e.g., a brushless direct-current motor) configured to drive the pump 104 via a gear reducer 106. The pump 104 is configured to draw fluid from a fluid reservoir 107 and provide hydraulic fluid to a hydraulic actuator cylinder 108, which includes a piston. A frame 108A and a bore of the hydraulic tool 100 form the hydraulic actuator cylinder 108.

The hydraulic actuator cylinder 108 has a first end 109A and a second end 109B. The first end 109A can be coupled to an assembly of the fluid reservoir 107, the pump 104, the gear reducer 106, and the electric motor 102, whereas the second end 109B can be coupled to a yoke 110. The yoke 110 can be U-shaped to form two arms 111 to which jaws 112A, 112B are pivotably mounted at a pivot 114.

The hydraulic tool 100 can include a piston 200 slidably disposed partially within the hydraulic actuator cylinder 108 and partially within the yoke 110. The piston 200 can have a distal end 204A coupled to a ram or other mechanism that is in turn coupled to the jaws 112A, 112B. When fluid is provided to the hydraulic actuator cylinder 108 from the pump 104, the fluid can push the piston 20 inside the hydraulic actuator cylinder 108, and thus the piston 200 extends. As the piston 200 extends (e.g., moves to the left in FIG. 1), the piston causes the jaws 112A, 112B to rotate about the pivot 114 toward a cable to perform a crimping or cutting operation. When the piston 200 is retracted, the jaws 112A, 112B pivot back away from the cable to an open position to release the cable. The jaws 112A, 112B are shown in FIG. 7 in an open position.

To make the hydraulic tool 100 more efficient, it may be desirable to have a tool where the piston can move at variable speeds and apply different loads based on the state of the tool or the cutting operation. For instance, the piston may be configured to advance rapidly at a fast speed while travelling within the hydraulic actuator cylinder 108 before the jaws 112A, 112B reach a cable to be cut or crimped. Once the jaws 112A, 112B reach the cable, the piston can slow down, but cause the jaws 112A, 112B to apply a large force to perform the cutting or crimping operation.

The hydraulic tool 100 can include a pressure sensor 116 configured to provide sensor information indicative of pressure level of the fluid in the first chamber 208. The pressure sensor 116 can be configured to provide the sensor information to the controller 504 of the hydraulic tool 100. In other embodiments, the hydraulic tool 100 can include a force sensor indicative of a force to which the piston 200 is subjected.

Embodiments of the invention provide a hydraulic system configured to control the hydraulic tool 100 and allow the piston to travel at least two different speeds and apply at least two different force magnitudes.

By the term "substantially" or "about" used herein, it is meant that the recited characteristic, parameter, value, or geometric planarity need not be achieved exactly, but that deviations or variations, including for example, tolerances, measurement error, measurement accuracy limitations and other factors known in the art, may occur in amounts that do not preclude the effect the characteristic was intended to provide.

The description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hydraulic tool comprising:
    a hydraulic actuator cylinder;
    a piston within the hydraulic actuator cylinder, the piston including a piston head, the piston head dividing an internal space of the hydraulic actuator cylinder into a first chamber and a second chamber;
    a fluid reservoir;
    a pump configured to draw fluid from the fluid reservoir and provide fluid to the first chamber via a hydraulic supply line;
    a regeneration check valve disposed in a regenerative extension fluid path that fluidly couples the second chamber to the first chamber; and
    a pilot-operated valve disposed in a power extension fluid path that fluidly couples the second chamber to the fluid reservoir, the pilot-operated valve comprising:
        a first port fluidly coupled to the second chamber;
        a second port directly fluidly coupled to the fluid reservoir; and
        a pilot port fluidly coupled to the hydraulic supply line via a pilot line.

2. The hydraulic tool of claim 1, wherein the piston is configured to move in a distal direction when the pressure of fluid provided to the first chamber from the pump via the hydraulic supply line exceeds a first threshold pressure value.

3. The hydraulic tool of claim 2, further comprising:
    a return spring disposed in the second chamber and configured to resist motion of the piston in the distal direction, wherein the first threshold pressure value is at least partially based on a spring rate of the return spring.

4. The hydraulic tool of claim 2, wherein the pilot-operated valve is configured to operate in: (i) a first state where the pilot-operated valve blocks fluid flow from the second chamber to the fluid reservoir, or (ii) a second state where the pilot-operated valve opens and allows fluid to flow therethrough from the second chamber to the fluid reservoir.

5. The hydraulic tool of claim 4, wherein the pilot-operated valve operates in the first state as the pressure of fluid provided to the pilot port via the pilot line remains below a second threshold pressure value.

6. The hydraulic tool of claim 5, wherein as the pressure of fluid remains below the second threshold pressure value, fluid is provided from the second chamber via the regenerative extension fluid path and the regeneration check valve disposed therein to the first chamber, thereby causing the piston to move at a first speed.

7. The hydraulic tool of claim 6, as pressure level of fluid provided to the first chamber and the pilot port of the pilot-operated valve exceeds the second threshold pressure value, the pilot-operated valve switches to operating in the second state, thereby: (i) causing fluid flow from the second chamber to be diverted away from the regenerative extension fluid path to the powered extension fluid through the pilot-operated valve to the fluid reservoir, and (ii) causing the piston to move at a second speed that is less than the first speed.

8. The hydraulic tool of claim 2, wherein, as the piston moves opposite the distal direction, fluid is supplied to the second chamber from the fluid reservoir via the pilot-operated valve, and the first chamber is blocked from the second chamber by a regeneration check valve.

9. The hydraulic tool of claim 1, further comprising:
    an electric motor configured to drive the pump;
    a pressure sensor configured to provide sensor information indicative of pressure level of fluid provided by the pump to the first chamber; and
    a controller in communication with the electric motor and the pressure sensor, the controller being configured to receive the sensor information from the pressure sensor, wherein the controller is configured to shut off the electric motor when the sensor information indicates that the pressure level has exceeded a threshold pressure value.

10. A method of operating a hydraulic tool, the method comprising:
    providing fluid from a pump via a hydraulic supply line to a first chamber of a cylinder of the hydraulic tool;
    moving a piston at a first speed within the cylinder when a pressure in the first chamber is less than a first threshold pressure so that fluid exits a second chamber of the cylinder as the piston moves within the cylinder;
    blocking fluid flow through a powered extension fluid path when the pressure in the first chamber is less than a second threshold pressure; and
    opening a pilot-operated valve to fluidly couple the second chamber to a fluid reservoir to allow fluid flow through the powered extension fluid path as the pressure at a pilot port of the pilot-operated valve exceeds the second threshold pressure so that the piston moves at a second speed that is less than the first speed, wherein the pilot-operated valve comprises a first port directly fluidly coupled to the second chamber and a second port directly fluidly coupled to the fluid reservoir.

11. The method of claim 10, wherein as the pressure in the first chamber increases above the first threshold pressure governed at least partially by a return spring, the piston moves at the first speed.

12. The method of claim 10, wherein as the pressure in the first chamber increases above the first threshold pressure, fluid flows through a regenerative extension fluid path from the second chamber to the first chamber.

13. The method of claim 10, wherein as the pressure in the first chamber increases above the second threshold pressure, fluid flows through the powered extension fluid path.

14. The method of claim 13, wherein the pilot-operated valve senses pressure at the first chamber.

15. The method of claim 10, wherein the pilot-operated valve is configured to operate in: (i) a first state where the pilot-operated valve blocks the fluid flow from the second chamber to the fluid reservoir, or (ii) a second state where the pilot-operated valve opens and allows fluid flow therethrough from the second chamber to the fluid reservoir and wherein causing the piston to move within the cylinder as fluid exiting the second chamber is provided via a regenerative extension fluid path to the first chamber comprises:
   operating the pilot-operated valve in the first state, thereby blocking fluid flow from the second chamber to the fluid reservoir.

16. The method of claim 10, wherein the hydraulic tool further comprises: (i) a pressure sensor configured to provide sensor information indicative of pressure level of fluid provided by the pump to the first chamber, and (ii) a controller in communication with an electric motor and the pressure sensor, the controller being configured to receive the sensor information from the pressure sensor, wherein the method further comprises:
   causing the controller to shut off the electric motor when the sensor information indicates that the pressure level has exceeded a third threshold pressure.

17. The method of claim 10, further comprising:
   blocking flow from the pump to the first chamber of the cylinder; and
   moving the piston within the cylinder via a return spring so that fluid flows from the fluid reservoir to the second chamber via a check valve in the pilot-operated valve.

18. A hydraulic tool comprising:
   a hydraulic actuator cylinder;
   a piston that actuates a tool portion of the hydraulic tool, the piston disposed within the hydraulic actuator cylinder, the piston dividing an internal space of the hydraulic actuator cylinder into a first chamber and a second chamber;
   a regenerative extension fluid path that directly fluidly couples the second chamber to the first chamber; and
   a pilot-operated valve disposed in a power extension fluid path that fluidly couples the second chamber to a fluid reservoir, the pilot-operated valve comprising:
      a first port directly fluidly coupled to the second chamber;
      a second port directly fluidly coupled to the fluid reservoir; and
      a pilot port fluidly coupled to a hydraulic supply line via a pilot line;
   fluid flow through the regenerative extension fluid path causing the piston to move at a first speed, and
   fluid flow through the powered extension fluid path causing the piston to move at a second speed that is less than the first speed.

19. The hydraulic tool of claim 18, wherein fluid flow through the regenerative fluid extension path produces a first force on the piston and fluid flow through the powered extension fluid path produces a second force that is greater than the first force.

20. The hydraulic tool of claim 18, wherein the tool portion includes jaws that rotate about a pivot point.

\* \* \* \* \*